(12) United States Patent
Bata et al.

(10) Patent No.: US 6,684,214 B2
(45) Date of Patent: Jan. 27, 2004

(54) SYSTEM AND METHOD HETEROGENEOUS DATA SOURCE INTEGRATION

(75) Inventors: Anthony P. Bata, Superior, CO (US); Kenneth R. Crismon, Bennett, CO (US)

(73) Assignee: Quovadx, Inc., Englewood, CO (US)

(*) Notice: Subject to any disclaimer, the term of this patent is extended or adjusted under 35 U.S.C. 154(b) by 323 days.

(21) Appl. No.: 09/918,621

(22) Filed: Jul. 30, 2001

(65) Prior Publication Data

US 2003/0028533 A1 Feb. 6, 2003

(51) Int. Cl.[7] .............................................. G06F 17/30
(52) U.S. Cl. ....................................................... 707/10
(58) Field of Search .......................... 707/7, 10; 705/1, 705/9; 709/205, 217, 229

(56) References Cited

U.S. PATENT DOCUMENTS 6,332,155 B1 * 12/2001 Notani ........................ 709/205
6,397,191 B1 * 5/2002 Notani et al. .................. 705/9
6,567,783 B1 * 5/2003 Notani et al. .................. 705/9

* cited by examiner

Primary Examiner—Diane D. Mizrahi
Assistant Examiner—Apu M. Mofiz
(74) Attorney, Agent, or Firm—Thelen Reid & Priest LLP; David B. Ritchie

(57) ABSTRACT

A system and method for enabling data exchanges between various data processing systems, including disparate systems, is described. In one exemplary embodiment, the present invention can include a message bus disposed between a set of data source recognizers and a set of content recognizers. In this embodiment, the data source recognizers are configured (1) to monitor for incoming/received data originating from an associated data provider such as a trading partner; (2) to extract the received data from a data handler, such as a web server; and (3) post the received data to the message bus. Once the data has been posted to the message bus, the individual content recognizers inspect the data and, if appropriate, pull the data from the message bus for subsequent processing.

18 Claims, 5 Drawing Sheets

SYSTEM AND METHOD HETEROGENEOUS DATA SOURCE INTEGRATION

RELATED APPLICATIONS

The present application is related to commonly owned and assigned application Ser. No. 09/798,572, currently pending, entitled Presenting and Structurally Representing General-Purpose Data Sources, and filed on Mar. 2, 2001, which is incorporated herein by reference.

FIELD OF THE INVENTION

The present invention relates to data processing systems. In particular, but not by way of limitation, the present invention relates to systems and methods for enabling data exchanges between various data processing systems, including disparate data processing systems.

BACKGROUND OF THE INVENTION

Companies are leveraging powerful new business-to-business (B2B) applications and network-based services to collaborate with customers and trading partners throughout the value chain. These companies are redefining existing relationships; creating compelling new relationships; and reaching new markets through a variety of online business models such as public e-marketplaces, private exchanges/supply chains, and direct trading partner links.

To fully capitalize on these new business applications and relationships, individual companies and e-marketplaces need to provide an efficient means of integrating trading partners into the various trading systems that exist today and that will exist tomorrow. Although most companies understand the benefit of such integration, these companies have also seen other companies undergo expensive, time-consuming projects to integrate their business systems, their trading partners' business systems, and the new technology. Rather than embarking on these expensive, time-consuming integration projects, many companies have avoided the process and instead, have opted to use electronic catalogs and to manually process B2B transactions. In other words, many companies have opted to manually reenter data into their backend systems even though the data was previously transmitted to them electronically through, for example, a web site or email.

Presently, a company's option for integrating disparate internal and external business systems centers on traditional middleware and custom-coded adapter technology—many adapters are built on a prepackaged adapter that requires significant customization. Middleware and adapters, however, typically cost hundreds of thousands of dollars and take many months to implement. Although these systems are functional, they are not satisfactory. Accordingly, a system and method are needed to address the shortfalls of present technology and to provide other new and innovative features.

SUMMARY OF THE INVENTION

Exemplary embodiments of the present invention that are shown in the drawings are summarized below. These and other embodiments are more fully described in the Detailed Description section. It is to be understood, however, that there is no intention to limit the invention to the forms described in this Summary of the Invention or in the Detailed Description. One skilled in the art can recognize that there are numerous modifications, equivalents and alternative constructions that fall within the spirit and scope of the invention as expressed in the claims.

The present invention can provide a system and method for enabling data exchanges between various data processing systems, including disparate systems, without the typical custom computer code generation generally required to accomplish such integration. In one exemplary embodiment, the present invention can include a message bus disposed between a set of data source recognizers and a set of content recognizers. In this embodiment, the data source recognizers are configured (1) to monitor for incoming/received data originating from an associated data provider such as a trading partner; (2) to extract the received data from a data handler, such as a web server; and (3) post the received data to the message bus. Once the data has been posted to the message bus, the individual content recognizers inspect the data and, if appropriate, pull the data from the message bus for subsequent processing.

An individual content recognizer in this embodiment can be configured to pull, for example, a specific transaction type—such as a purchase order received from a particular trading partner—from the message bus. The content recognizer can then perform a series of predetermined transactions using the data pulled from the message bus. These steps can include making calls to an application program interface (API), making inserts/deletes to a database table, retrieving data from a database table, sending responses to trading partners, etc. Thus, the content recognizers cannot only pull data from the message bus, they can also post data to the message bus. Notably, this embodiment of the present invention can initiate these transactions across disparate systems, thereby providing integration both between trading partners and an enterprise and between an enterprise's own backend systems.

In one embodiment, the present invention achieves integration across disparate systems by joining data from disparate systems rather than only data from related database tables. For example, embodiments of the present invention can join data from data systems such as APIs, web services, messaging systems, databases of different types, event messengers, ERP systems and the like. In the structured query language (SQL) of relational databases, a join is a combination of tables in a database using a common element (key). In this context, the concept of a join can be extended to include a combination of data elements from disparate systems and different data structures (e.g., hierarchical and relational.) Even though data from disparate systems is being joined, the join behaves the same as if two tables from the same database type were being joined. One implementation of the join process is described in commonly owned and assigned U.S. patent application Ser. No. 09/798,572, currently pending, entitled Presenting and Structurally Representing General-Purpose Data Sources.

The join of data from these disparate systems can be represented as a node in a hierarchical structure, e.g., tree. This node can then be mapped to the fields of an incoming document so that data fields in the incoming document can be recognized and easily used by the content recognizers, or other modulas, in subsequent transactions. By joining disparate data sources, embodiments of the present invention, with a minimal amount of custom-coding, can enable the creation of a transaction process that uses several disparate systems. Joining of data from disparate data sources, however, is not necessarily required for the operation of the present invention.

As previously stated, the above-described embodiments and implementations are for illustration purposes only. Numerous other embodiments, implementations, and details of the invention are easily recognized by those of skill in the art from the following descriptions and claims.

BRIEF DESCRIPTION OF THE DRAWINGS

Various objects and advantages and a more complete understanding of the present invention are apparent and more readily appreciated by reference to the following Detailed Description and to the appended claims when taken in conjunction with the accompanying Drawings wherein:

DETAILED DESCRIPTION

Figure 1:
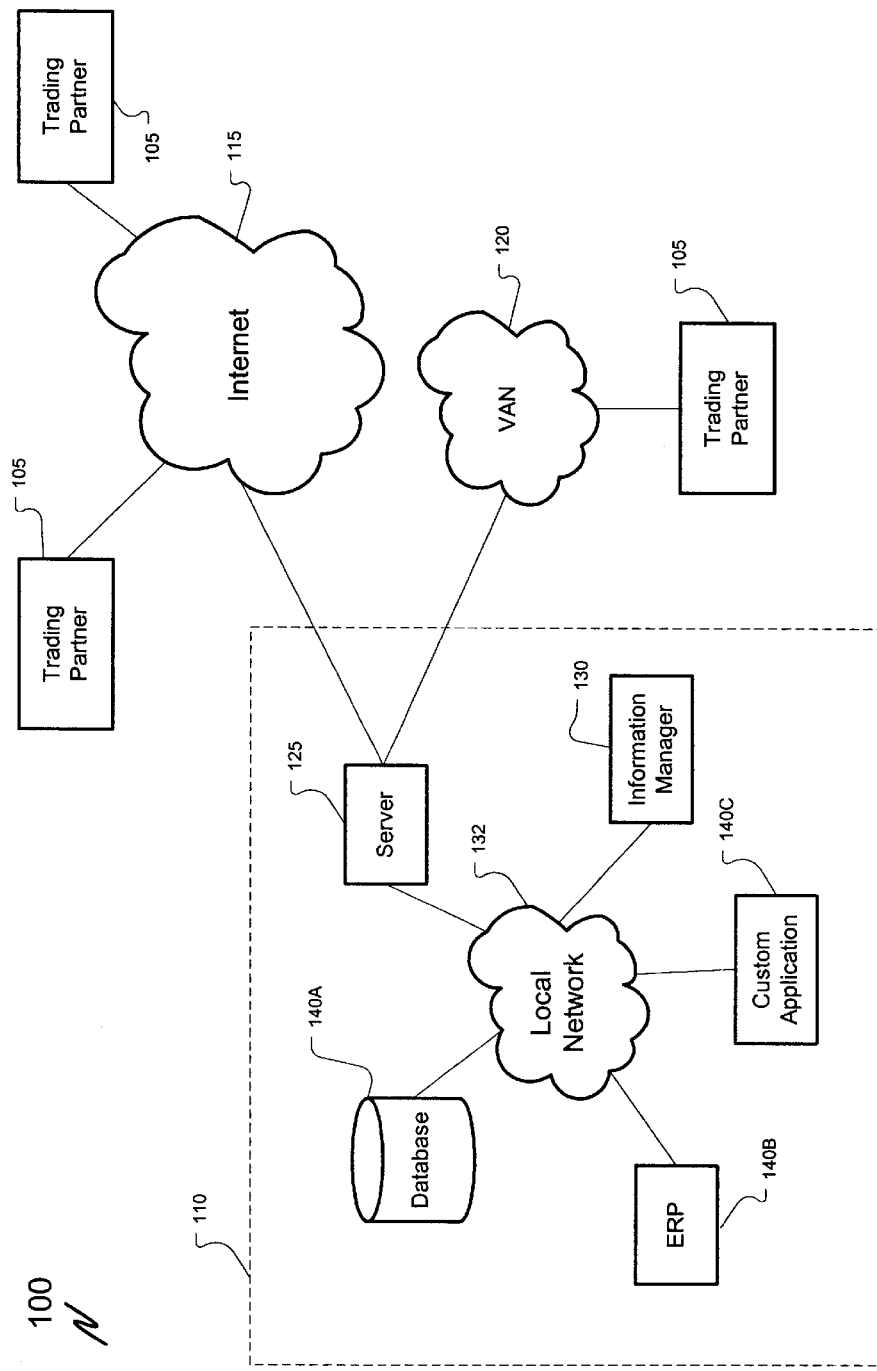
FIG. 1 is a high level diagram of a system incorporating one embodiment of the present invention.

Referring now to the drawings, where like or similar elements are designated with identical reference numerals throughout the several views, and referring in particular to FIG. 1, it illustrates a high level diagram of a system 100 incorporating one embodiment of the present invention. This system 100 includes a plurality of trading partners 105 connected with a transaction-conducting enterprise 110 through either the Internet 115 or a value-added network (VAN) 120. As can be appreciated by those of skill in the art, other trading partners could be connected with the enterprise 110 through other means.

In operation, a trading partner 105 transfers data to the enterprise 110. For example, a trading partner 105 could transfer a purchase order to the enterprise's server 125. The information manager 130, via a local network 132, could then recognize that a purchase order was received from a trading partner 105, parse the purchase order, map the purchase order data fields to a join of the appropriate data structures, and provide the appropriate portions of the data to the relevant backend systems 140. In one embodiment, the purchase order could be added to the database 140A and an inventory management system 140C (shown as a custom application) could be updated to reflect the quantities ordered in the received purchase order. These steps are described in more detail below. Notably, however, the information manger 130 can process data received in most any format and communicate that data to various, disparate backend systems 140 with a minimal amount of custom coding.

Figure 2:
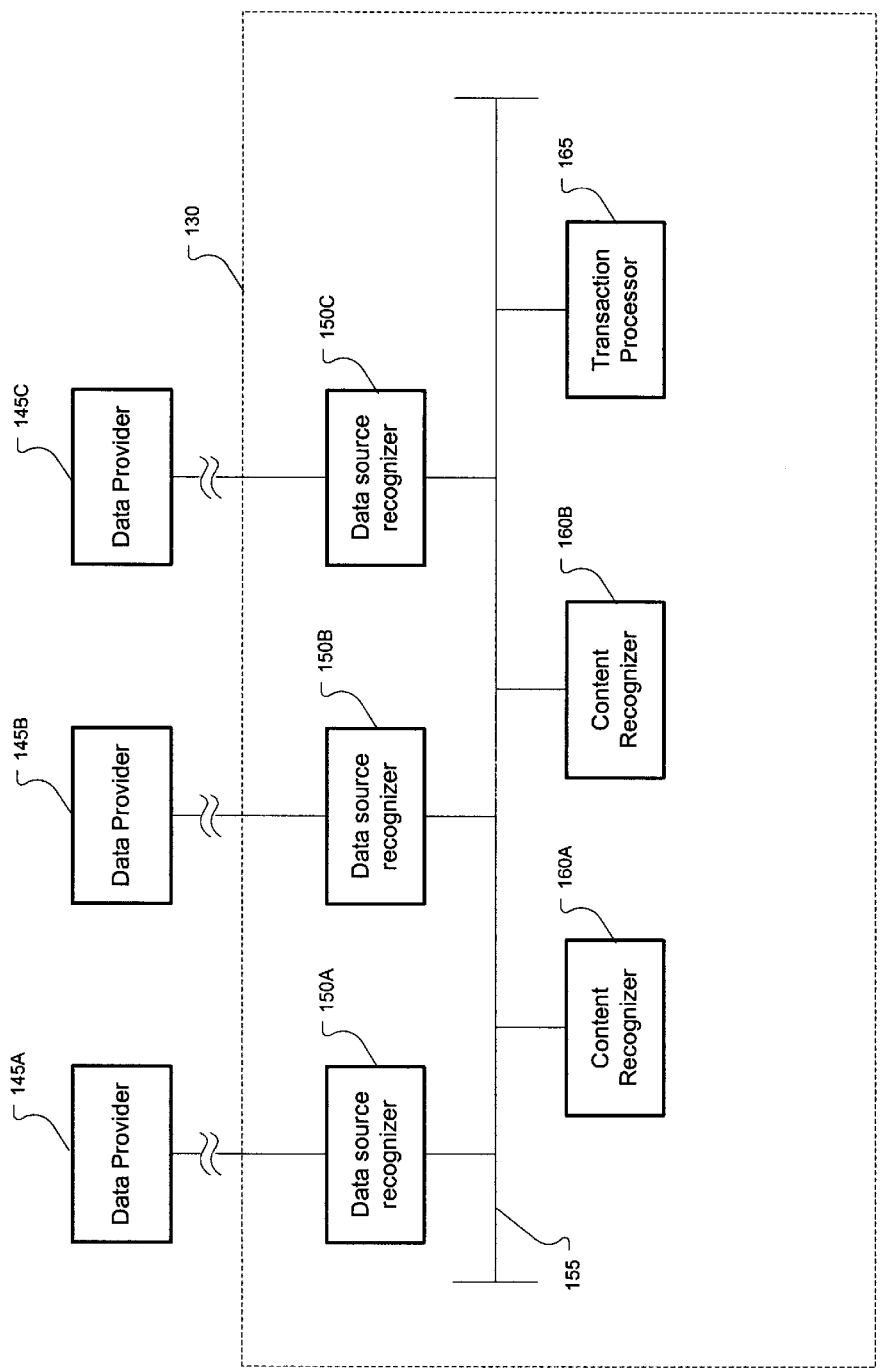
FIG. 2 is a block diagram of one embodiment of an information manager constructed in accordance with the principles of the present invention.

Referring now to FIG. 2, it is a block diagram of one embodiment of an information manager 130 constructed in accordance with the principles of the present invention. In this embodiment, a plurality of data providers 145 are in communication with the information manager 130. The term "data providers" is used to refer generally to any system that exchanges data with the information manager 130. For example, the data providers 145 include trading partners 105 and/or the enterprise's backend systems 140 (both shown in FIG. 1.) Moreover, data providers 145 are assumed to provide documents of data to the enterprise 110. Thus, the data received by the data sources is referred to herein as documents. However, the data sources are by no means limited to receiving only documents and the data providers 145 are not limited to exchanging documents with the information manager.

The data source recognizers 150 included in the information manager 130 are configured to enable an exchange and manipulation of data between the data providers 145 even though the data providers 145 can include disparate systems. In one embodiment, the data source recognizers 150 are configured to monitor specific communications channels for documents originating from certain data providers. For example, data source recognizer 150A could monitor a web server 125 (shown in FIG. 1) to identify files sent to the enterprise 110 via HTTP. Another data source recognizer 150B could monitor for documents originating from an Oracle™ database 145B (also 140A in FIG. 1) attached to the local network 132 or for documents originating from a web service provider (a SAP system, a Java API, etc.). In addition to monitoring and identifying the source of incoming documents, the data source recognizer 150 can be further configured (1) to recognize data items placed on the message bus 155 by other data source recognizers 150 and/or content recognizers 160, (2) to extract any recognized data items, and (3) to provide, e.g., push, extracted data items from a document to the relevant data providers 145.

Still referring to FIG. 2, when a data source recognizer 150 recognizes a received document as originating from a monitored source, the data source recognizer 150 can parse the document and post the data contained therein to the message bus 155 or, if necessary, push the document to some other system. For example, if data source recognizer 150A is configured to monitor for documents originating from data provider 145A, and data source recognizer 150A identifies a document received at the web server 125 (shown in FIG. 1) as originating from data provider 145A, data source recognizer 150A can parse the received document and place the resulting data on the message bus 155. Data source recognizer 150A, however, may ignore all other externally received documents.

Once the document, or the parse results, are placed on the message bus 155, the individual content recognizers 160 can inspect the contents of the data and determine whether to pull the data from the message bus 155 for processing or whether to ignore the data. Notably, the content recognizers 160 can inspect the document's header data as well as its contents. Thus, a content recognizer 160 can be configured to identify a document based on its contents rather than merely its header information. For example, when content recognizer 160A is configured to monitor for purchase orders from data provider 145A, the content recognizer 160A can search a received document for data provider 145A's name and typical purchase order characteristics. When the content recognizer 160A detects a match with a document on the message bus 155, it can pull the document. Otherwise, it can ignore all other documents on the message bus 155.

After a content recognizer 160 recognizes and pulls data from the message bus 155, the content recognizer 160 can initiate a transaction process, for example, by calling the transaction processor 165 or by initiating procedures internal to the content recognizer 160. For example, when the content recognizer 160 is configured to monitor for purchase orders from a particular trading partner, the associated transaction process could include a step for storing the purchase order in a database and a step for changing an inventory count in an inventory management system. Generally, the systems that maintain these different data items, i.e., purchase order data and inventory data, are disparate. The purchase order data system, for example, could be an Oracle database system interfaced through a standard Oracle interface and the inventory management system could be a custom system interfaced through an associated API. Despite the differences in the two systems, embodiments of the present invention can access these systems and perform the necessary transactions without necessarily using the expensive adapters and middleware of present technology. The process for performing these transactions is discussed in detail herein.

Figure 3:
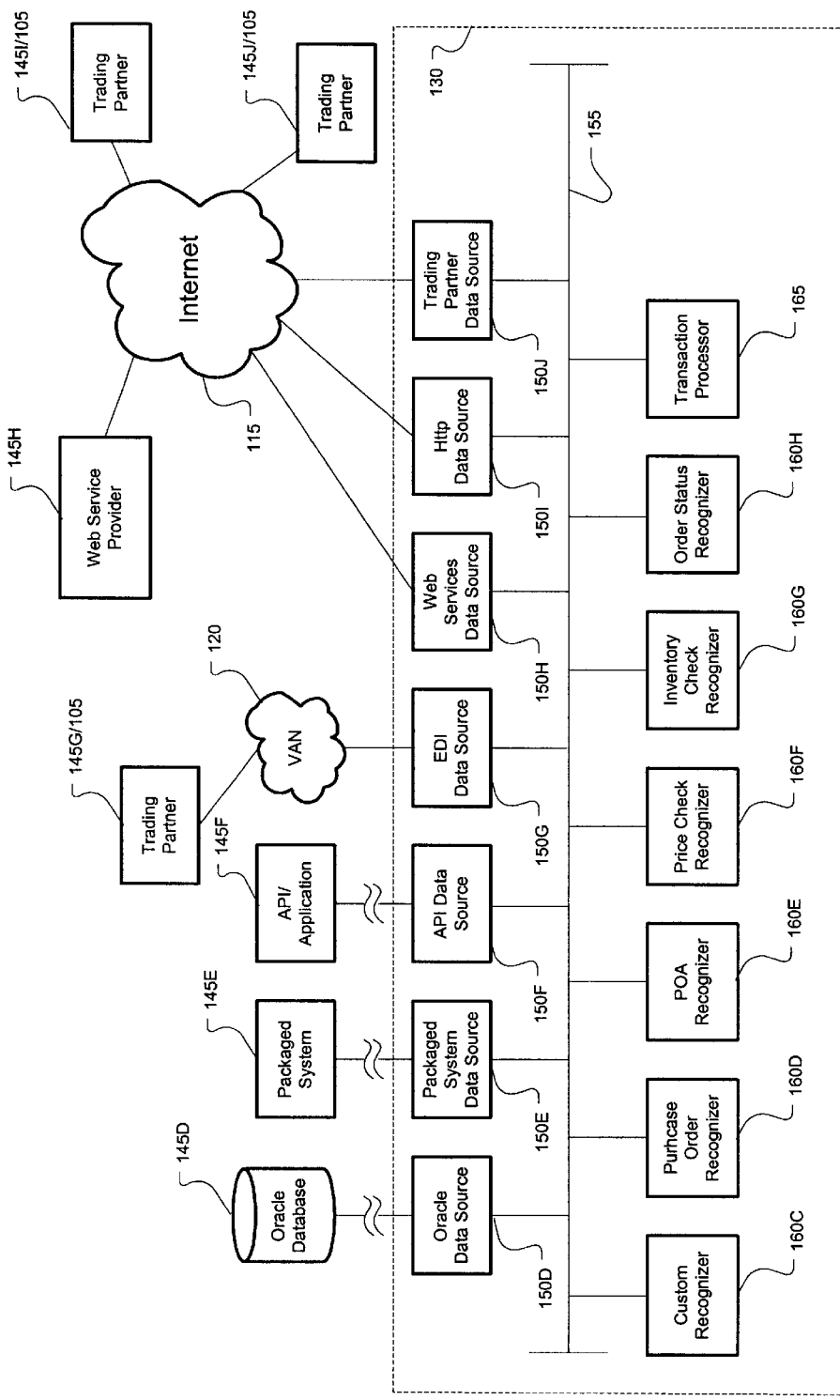
FIG. 3 is a block diagram of an alternate embodiment of an information manager constructed in accordance with the principles of the present invention.

Referring now to FIG. 3, it is a block diagram of an alternate embodiment of an information manager 130 constructed in accordance with the principles of the present invention. As with FIG. 3, this embodiment includes a plurality of content recognizers 160 and a plurality of data source recognizers 150. The generic components of FIG. 2, however, have been replaced with detailed components to further illustrate the versatility and adaptability of the information manager 130.

In particular, this embodiment includes an Oracle data source recognizer 150D, a packaged system data source recognizer (packaged systems include ERP systems), an API data source recognizer 150F, an EDI data source recognizer 150G, a web service data source recognizer 150H, an HTTP data source recognizer 150I, and a trading partner data source recognizer 150J. Each of these data source recognizers 150 is configured to exchange data with an appropriate data provider 145D–145J. Additionally, the generic content recognizers 160A–160B have been replaced with a series of specific content recognizers: a purchase order recognizer 160D, a purchase order acknowledgement recognizer 160E, a price check recognizer 160F, an inventory check recognizer 160G, and an order status recognizer 160H. As can be appreciated, other recognizers, represented by the custom recognizer 160C, can be configured to meet an enterprise's 110 specific needs. Moreover, multiple copies of these content recognizers 160 can be created and custom configured. For example, different purchase order recognizers 160D can be created for different trading partners 145I/105 and 145J/105.

Figure 4:
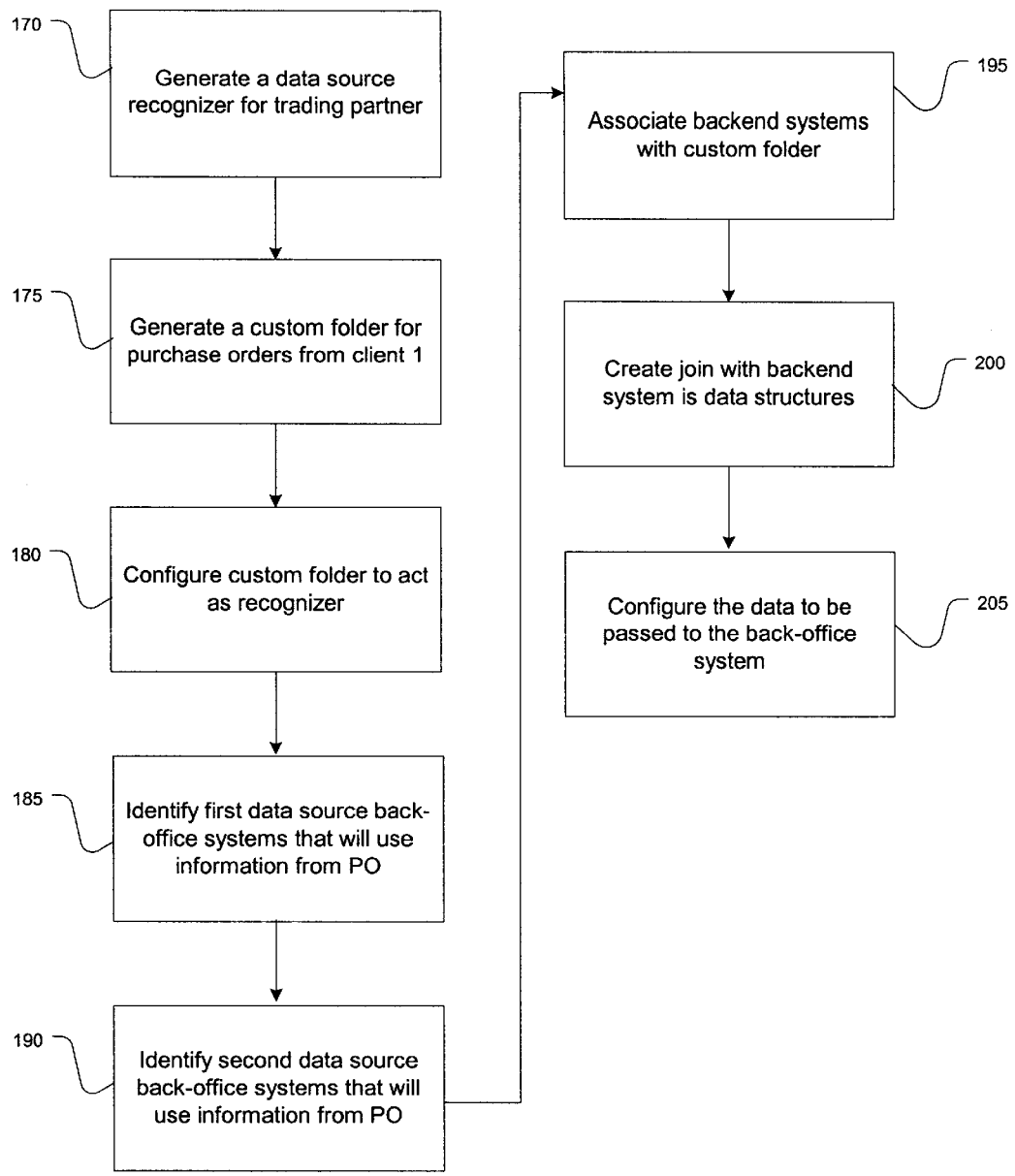
FIG. 4 is a flowchart of one method in accordance with the present invention for configuring an information manager.
Figure 5:
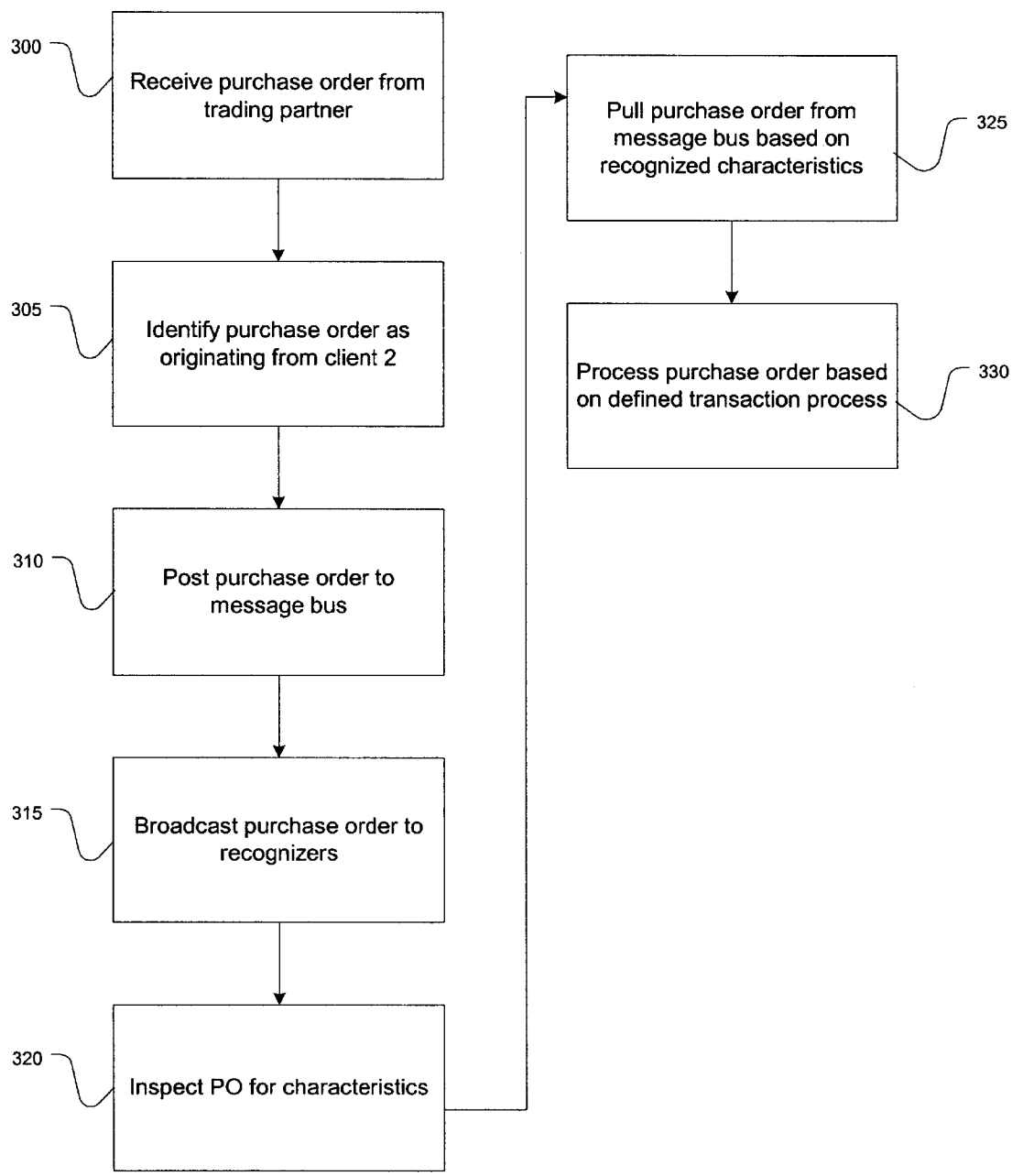
FIG. 5 is a flowchart of one method in accordance with the present invention for processing a purchase order.

To further illustrate the operation of the information manger 130, a method for configuring an information manager to process a purchase order is illustrated in FIG. 4, and a run-time operation of the information manager using that a configuration is shown in FIG. 5. Both of these methods are described with relation to FIG. 3 and are exemplary only.

Referring now to FIG. 4, it illustrates one method for configuring the information manager to process an incoming purchase order originated from a trading partner. To configure the information manager to process a purchase order from a trading partner, such as trading partner 145I/105, an administrator for the information manager 130 generates a data source recognizer, such as data source recognizer 150J (step 170). The data source recognizer can be specifically pointed at the trading partner, i.e., it only listens for documents originating from the trading partner (step 170), or the data source recognizer can be pointed to an HTTP connection such that it listens for any documents received via the HTTP connection.

Once the data source recognizer for the trading partner has been generated, a custom module for the trading partner's purchase order should be created (step 175). In the preferred embodiment, the custom module is represented as a file folder called "trading partner PO" in a Windows™ file structure. Moreover, in the presently preferred embodiment, the data source recognizer can also be logically represented as a file folder in a Windows file structure. As those of skill in the art can understand, the data source recognizer and the custom module could be represented in various other ways, including other file structures such as those in a Solaris™ environment. For the description of FIGS. 4 and 5, however, the method of operation will be described with regard to file folders as commonly seen in the Windows environment. This description is exemplary only.

The trading partner PO recognizer, represented as the trading partner PO folder, is an empty content recognizer until configured. In other words, the trading partner PO recognizer should be pointed to an input source, pointed to output locations, and given a defined transaction process (step 180). Such configuration could involve configuring the trading partner PO recognizer to look for unique information that will be found in the purchase order. Such unique information can be found in the header and/or in the body of the purchase order received from trading partner 1. Physically, this configuration can be done through changing the properties of the trading partner PO folder rather than through custom coding, as is generally done in traditional integration technologies.

Once the trading partner PO recognizer has been pointed to an input source and configured as a recognizer, the data source recognizers for any backend systems—or files/tables/programs within a backend system—that will use purchase orders from trading partner should be associated with the trading partner PO recognizer (steps 185 and 190). This association can be completed by copying folders associated with the particular backend systems into the trading partner PO folder (step 195). These folders typically contain information about methods for communicating with the associated backend systems. Moreover, the information manager can "discover" the interfaces. As previously described, the data providers in FIG. 2 can include these backend systems.

The information manager next performs a join of the data structures associated with the relevant backend systems (step 200). This join can be completed even if the relevant backend systems are disparate. The join operation can be completed using "drag and drop" mouse operations, without writing any computer code. Diagram A shows such a join where the first data set represents the fields required by an API associated with the inventory management system, the second data set represents the columns in the purchase order database table, and the third data set represents the node resulting from a join of the first data set and the second data sets. Notably, the join shown in Diagram A involves data from disparate systems rather than data merely from different tables within a database.

| Diagram A: Join Results | |
|---|---|
| API | Database |
| Attribute 1 | Column 1 |
| Attribute 2 | Column 2 |
| Attribute 3 | Column 3 |
| Join Node | |
| Attribute 1 | |
| Attribute 2 | |
| Attribute 3 | |
| Column 1 | |
| Column 2 | |
| Column 3 | |

The join shown in Diagram A creates a single document, which in the preferred embodiment is an XML document, representing the data needed to process a purchase order received from the trading partner. This document can be used to map the data in an incoming purchase order to the appropriate fields in other systems such as the inventory management system and the purchase order database table. This mapping can be done in a visual interface without writing any custom code, as is generally necessary.

Finally, the trading partner PO recognizer can be configured to transform, if necessary, and to pass the appropriate data to the backend systems and/or data providers (step 205). For example, the PO recognizer can be configured to condition the purchase order database table for insertion of a new record. Alternatively, the purchase order database table can be configured to accept an insert from the trading partner PO recognizer. Similarly, the trading partner PO recognizer can be configured to pass particular parameters to the API associated with the inventory management system. For example, the trading partner PO recognizer can be configured to pass an item number to the API such that the inventory management system returns the current inventory for that item. If the current inventory is less than the requested number of items in the purchase order, a message can be generated and placed on the message bus.

Referring now to FIG. 5, there is illustrated the run-time operation of the information manager 130 as configured in FIG. 4. Initially, the trading partner PO recognizer identifies a purchase order received from the trading partner and posts that purchase order to the message bus 155 where it is parsed and broadcast to all of the content recognizers 160 (steps 300 and 315). The preconfigured trading partner PO recognizer inspects the data placed on the message bus 155 and extracts the purchase order (steps 320 and 325). Finally, the trading partner recognizer initiates the defined transaction process (step 330). For example, the appropriate fields can be passed to the inventory management system API, API 145F for example, and the purchase order can be inserted into the purchase order database table, database 145D for example.

As those skilled in the art can understand, FIGS. 4 and 5 are merely illustrations of the operation of one simple embodiment of the present invention. Accordingly, the present invention should in no way be limited to the implementations described in relation thereto. The present invention can be adapted to meet almost any business demand—whether it be transactional integration or other demand.

In conclusion, the present invention provides, among other things, a system and method for enabling data exchanges between various data processing systems. Those skilled in the art can readily recognize that numerous variations and substitutions may be made in the invention, its use and its configuration to achieve substantially the same results as achieved by the embodiments described herein. Accordingly, there is no intention to limit the invention to the disclosed exemplary forms. Many variations, modifications and alternative constructions fall within the scope and spirit of the disclosed invention as expressed in the claims.

What is claimed is:

1. A method for exchanging data between disparate data providers, the method comprising:

receiving, at a data source recognizer, a data item having a plurality of characteristics, wherein the data item is originated by a particular data provider;

recognizing the data item as originating from the particular data provider;

posting at least a portion of the data item to a message bus, wherein the posted at least a portion of the data item includes the plurality of characteristics;

providing the at least a portion of the data item to a plurality of content recognizers;

inspecting, at the plurality of content recognizers, the at least a portion of the data item for a particular one of the plurality of characteristics;

determining whether the particular one of the plurality of characteristics is included in the at least a portion of the data item;

responsive to determining that the particular one of the plurality of characteristics is included in the at least a portion of the data item, pulling the at least a portion of the data item from the message bus; and initiating a transaction process using the at least a portion of the data item;

wherein the transaction process is configurable to manipulate data associated with disparate data providers.

2. The method of claim 1, further comprising:

monitoring a data handler for a document originating from the particular content provider.

3. The method of claim 1, further comprising:

monitoring a communications channel for a document originating from at least the particular content provider.

4. The method of claim 3, wherein the communication channel comprises a HTTP-based channel.

5. The method of claim 1, further comprising:

identifying a plurality of data systems associated with the received data item, wherein each of the plurality of data systems is associated with a corresponding data structure; and joining the data structures for each of the identified plurality of data systems.

6. The method of claim 5, wherein the data structures are contained in different physical structures.

7. The method of claim 5, further comprising:

mapping the join of the data structures with the received data item.

8. The method of claim 7, further comprising:

providing data from the received data item to at least a first of the plurality of data systems according to the mapping.

9. A method for exchanging data between disparate data providers, the method comprising:

receiving, at a data source recognizer, a data item having a plurality of characteristics, wherein the data item is originated by a particular data provider;

recognizing the data item as originating from the particular data provider;

posting at least a portion of the data item to a message bus, wherein the posted at least a portion of the data item includes the plurality of characteristics;

providing the at least a portion of the data item to a plurality of content recognizers;

inspecting, at the plurality of content recognizers, the at least a portion of the data item for a particular one of the plurality of characteristics;

determining whether the particular one of the plurality of characteristics is included in the at least a portion of the data item;

responsive to determining that the particular one of the plurality of characteristics is included in the at least a portion of the data item, pulling the at least a portion of the data item from the message bus; and initiating a transaction process using the at least a portion of the data item;

wherein the transaction process is configurable to manipulate data associated with disparate data providers.

10. The method of claim 9, further comprising:

monitoring a data handler for a document originating from the particular content provider.

11. The method of claim 9, further comprising:

identifying a plurality of data systems associated with the received data item, wherein each of the plurality of data systems is associated with a corresponding data structure; and joining the data structures for each of the identified plurality of data systems.

12. The method of claim 11, wherein the data systems are disparate.

13. The method of claim 11, further comprising:

mapping the join of the data structures with the received data item.

14. The method of claim 13, further comprising:

providing data from the received data item to at least a first of the plurality of data systems according to the mapping.

15. A system for exchanging data between disparate data providers, the method comprising:

means for receiving a data item having a plurality of characteristics, wherein the data item is originated by a particular data provider;

means for recognizing the data item as originating from the particular data provider;

means for posting at least a portion of the data item to a message bus;

means for providing the at least a portion of the data item to a plurality of content recognizers;

means for inspecting the at least a portion of the data item for a particular one of the plurality of characteristics;

means for determining whether the particular one of the plurality of characteristics is included in the at least a portion of the data item;

responsive to determining that the particular one of the plurality of characteristics is included in the at least a portion of the data item, means for pulling the at least a portion of the data item from the message bus; and initiating a transaction process using the at least a portion of the data item.

16. The system of claim 15, further comprising:

means for identifying a plurality of data systems associated with the received data item, wherein each of the plurality of data systems is associated with a corresponding data structure; and means for joining the data structures for each of the identified plurality of data systems.

17. The system of claim 15, further comprising:

means for mapping the join of the data structures with the received data item.

18. The method of claim 17, further comprising:

means for providing data from the received data item to at least a first of the plurality of data systems according to the mapping.

* * * * *

UNITED STATES PATENT AND TRADEMARK OFFICE
CERTIFICATE OF CORRECTION

PATENT NO. : 6,684,214 B2  
DATED : January 27, 2004  
INVENTOR(S) : Anthony P. Bata and Kenneth R. Crismon It is certified that error appears in the above-identified patent and that said Letters Patent is hereby corrected as shown below:

<u>Title page, Item [54] and Column 1, lines 1-2,</u>  
Title, replace "SYSTEM AND METHOD HETEROGENEOUS DATA SOURCE INTEGRATION" with -- SYSTEM AND METHOD FOR HETEROGENEOUS DATA SOURCE INTEGRATION --.

Signed and Sealed this

Nineteenth Day of October, 2004

JON W. DUDAS  
*Director of the United States Patent and Trademark Office*